United States Patent
Arden

(10) Patent No.: US 8,573,566 B2
(45) Date of Patent: *Nov. 5, 2013

(54) FREESTANDING FENCE SYSTEM

(75) Inventor: Dennis Arden, Claremore, OK (US)

(73) Assignee: ArdenX LLC, Miami, FL (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/835,421

(22) Filed: Jul. 13, 2010

(65) Prior Publication Data

US 2011/0024708 A1    Feb. 3, 2011

Related U.S. Application Data

(63) Continuation of application No. 11/713,052, filed on Mar. 1, 2007, now Pat. No. 7,753,346.

(51) Int. Cl.
E04H 17/14    (2006.01)

(52) U.S. Cl.
USPC .............................. 256/64; 256/1; 256/65.01

(58) Field of Classification Search
USPC ........ 256/1, 10, 26, 32, 37, 40, 63, 64, 65.01, 256/65.02, 68; 404/6, 9; 403/52, 53, 55, 57, 403/59, 60, 72, 150, 151, 157; 464/119
See application file for complete search history.

(56) References Cited

U.S. PATENT DOCUMENTS

| | | | | |
|---|---|---|---|---|
| 86,133 A | * | 1/1869 | Calkins | 256/63 |
| 293,342 A | * | 2/1884 | Messenger | 256/1 |
| 310,555 A | * | 1/1885 | Brevoort | 256/63 |
| 344,413 A | * | 6/1886 | Shedd | 256/63 |
| 380,529 A | * | 4/1888 | Shelley | 256/63 |
| 381,047 A | * | 4/1888 | Wood | 256/63 |
| 393,168 A | * | 11/1888 | Maxam | 256/63 |
| 406,642 A | * | 7/1889 | Frost | 256/40 |
| 673,997 A | * | 5/1901 | Chapman | 49/386 |
| 674,204 A | * | 5/1901 | Grant | 256/63 |
| 801,942 A | * | 10/1905 | Warner et al. | 256/32 |
| 1,838,151 A | * | 12/1931 | Penote | 256/64 |
| 2,805,277 A | * | 9/1957 | Moeller | 174/161 R |
| 2,855,183 A | | 10/1958 | Moore | |
| 3,767,167 A | | 10/1973 | Rasmussen | |
| 3,910,560 A | | 10/1975 | Goetz | |
| 3,921,585 A | | 11/1975 | Hall | |

(Continued)

FOREIGN PATENT DOCUMENTS

EP    1199509 A2 *  4/2002
JP    2004300742 A   10/2004

*Primary Examiner* — Gregory Binda
*Assistant Examiner* — Nahid Amiri
(74) *Attorney, Agent, or Firm* — Molly D. McKay

(57) ABSTRACT

A freestanding fence supported on x-shaped posts or x-posts that sit on top of the ground. Two tubes are welded together at approximately a 55 degree angle to form each x-post. The legs of the x-posts are provided with adjustable length feet and with receivers for holding electrical or non-electrical fence wires. Universal joints secure horizontal members between adjacent x-posts. The universal joints secure to a pair of ears proved on each leg of the x-posts. An adjustable height footed vertical support member can be installed on each horizontal member approximately midway between the adjacent x-posts. The fence is constructed of easily transported and assembled pieces that can be disassembled, moved, and then reassembled as often as needed. Once assembled, the fence is strong and stable and can be used to mount various types of equipment such as lighting, security, camera, motion detection, solar panels, radio frequency identification devices, etc.

10 Claims, 7 Drawing Sheets

(56) References Cited

U.S. PATENT DOCUMENTS

| | | | |
|---|---|---|---|
| 4,145,030 A | 3/1979 | Ingraham | |
| 4,145,031 A | 3/1979 | Baker, II | |
| 4,172,427 A | 10/1979 | Kindred | |
| 4,339,114 A | 7/1982 | Deike | |
| 4,682,761 A | 7/1987 | Hanneken | |
| 4,763,879 A * | 8/1988 | Wasicek et al. | 256/36 |
| 4,860,996 A | 8/1989 | Robbins, III | |
| 4,889,322 A * | 12/1989 | Wagner | 256/36 |
| 5,063,876 A | 11/1991 | Harris | |
| 5,150,484 A | 9/1992 | Whitten, Jr. | |
| 5,301,910 A | 4/1994 | Lang et al. | |
| 5,318,258 A | 6/1994 | Lang | |
| 5,593,143 A * | 1/1997 | Ferrarin | 256/68 |
| 5,722,642 A | 3/1998 | Bradshaw | |
| 5,732,527 A | 3/1998 | Schneider | |
| 5,738,342 A | 4/1998 | Van Winkle | |
| 5,930,932 A * | 8/1999 | Peterson | 42/94 |
| 5,961,242 A * | 10/1999 | Leone | 403/234 |
| 6,126,147 A | 10/2000 | Fingerson et al. | |
| 6,257,559 B1 | 7/2001 | Mouri | |
| 6,745,414 B2 | 6/2004 | Zhou | |
| 6,802,496 B1 * | 10/2004 | Preta | 256/65.04 |
| 6,866,252 B2 * | 3/2005 | Pulliam | 256/40 |
| 7,048,474 B2 | 5/2006 | Tabler | |

\* cited by examiner

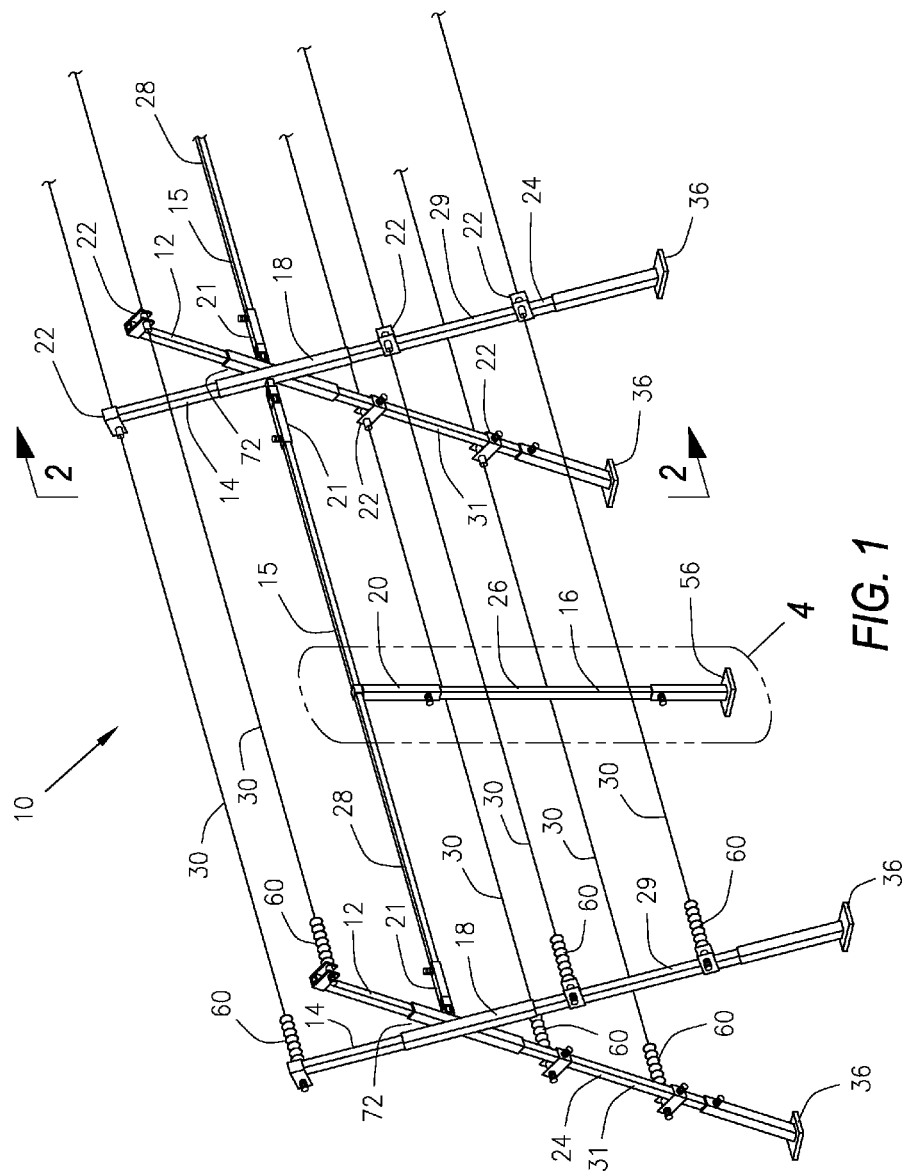

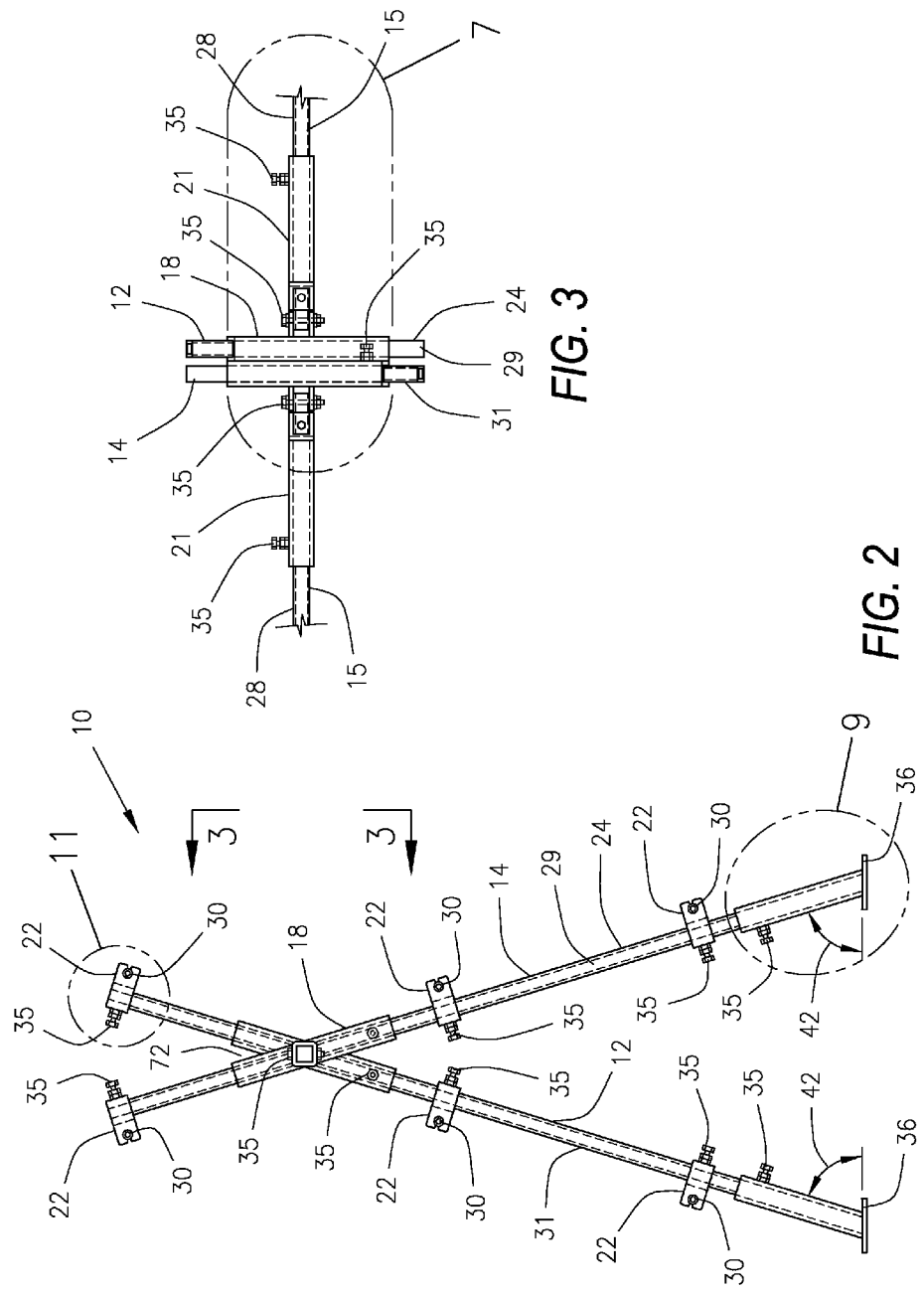

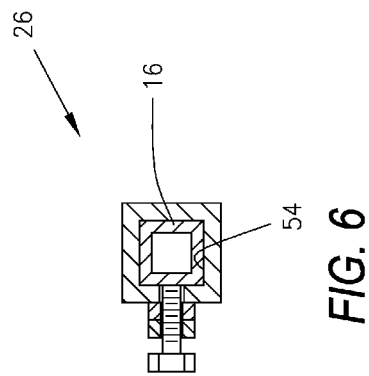
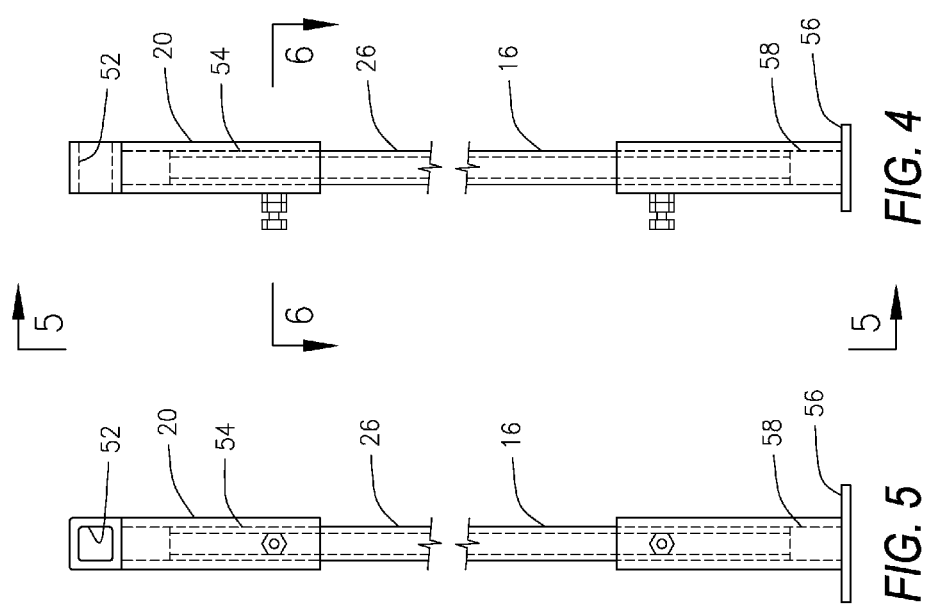

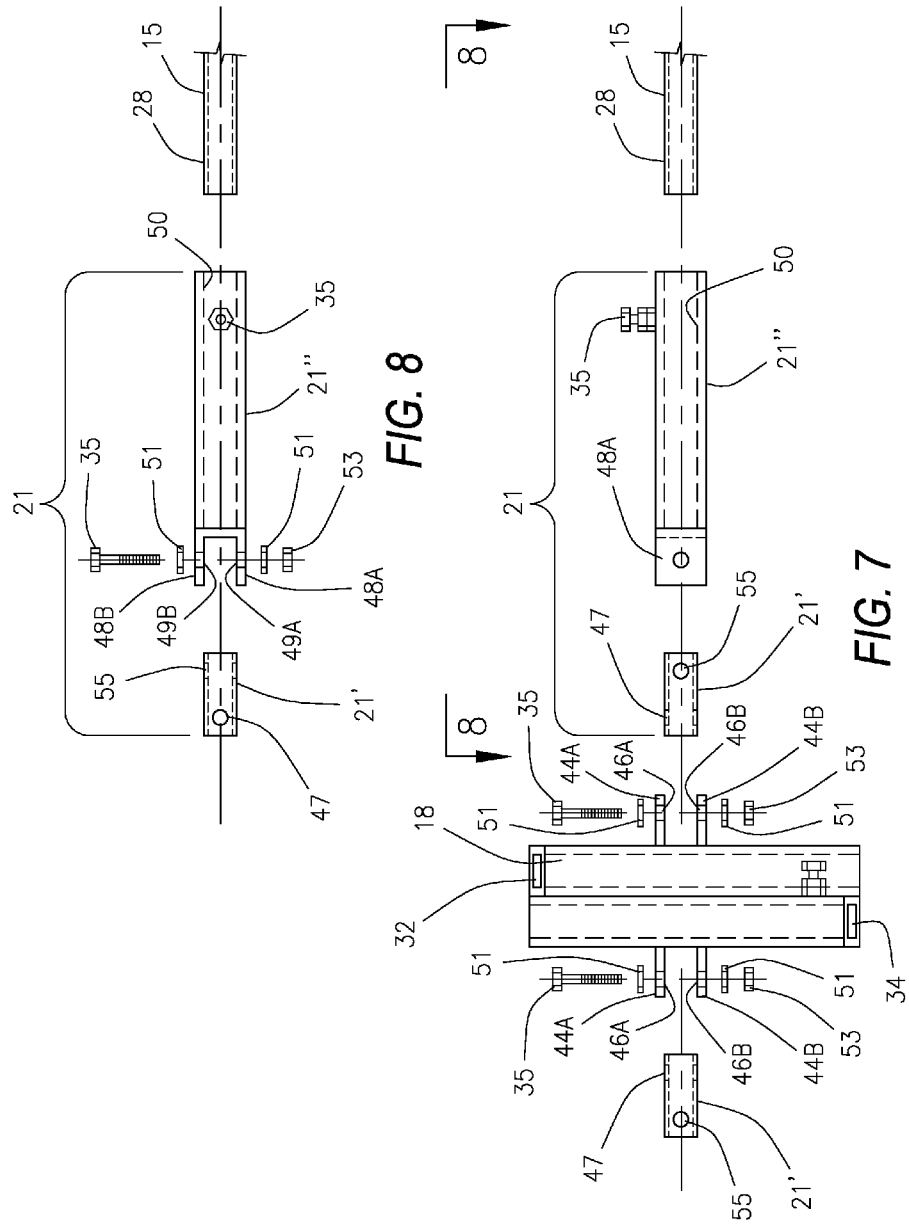

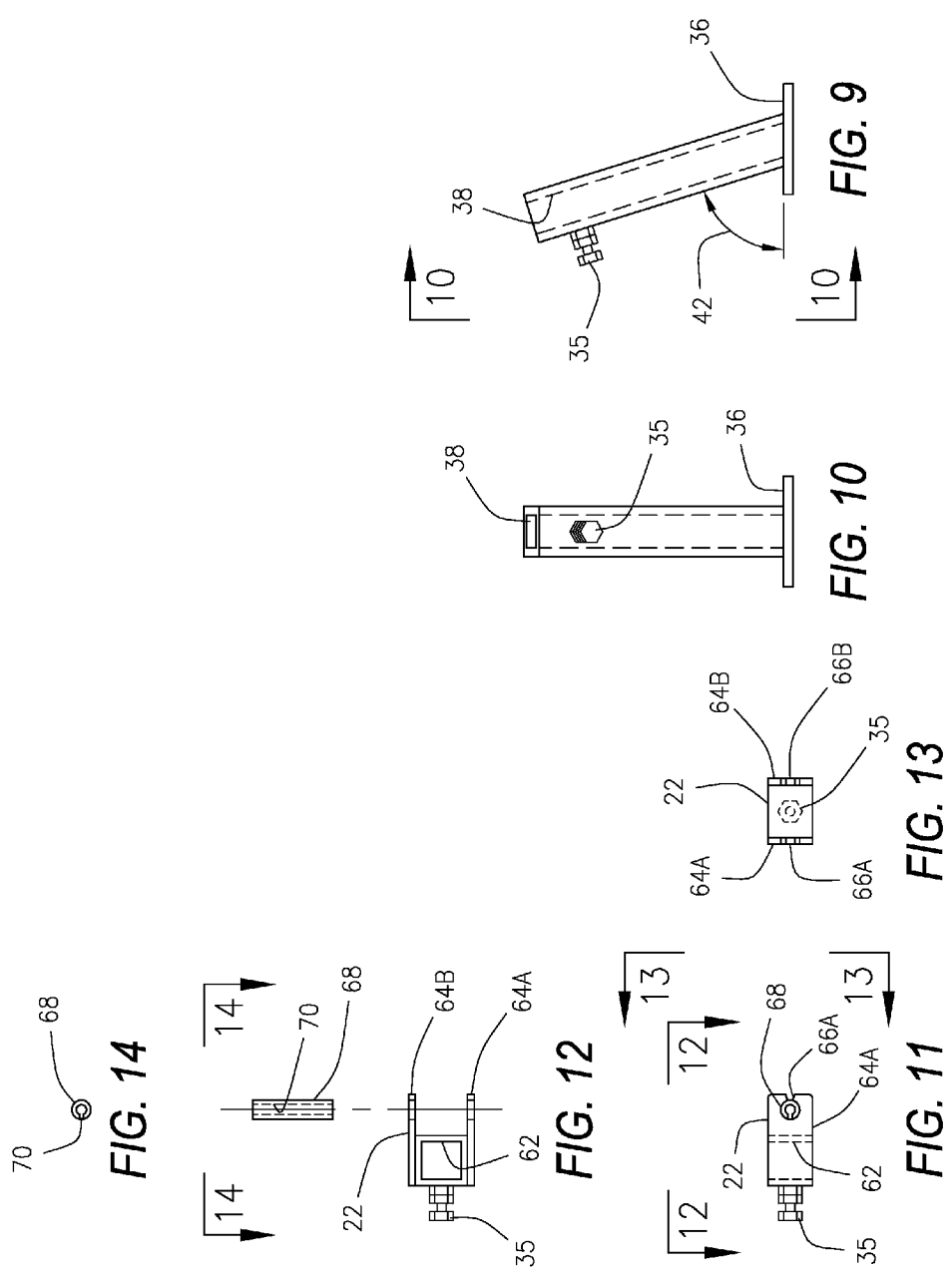

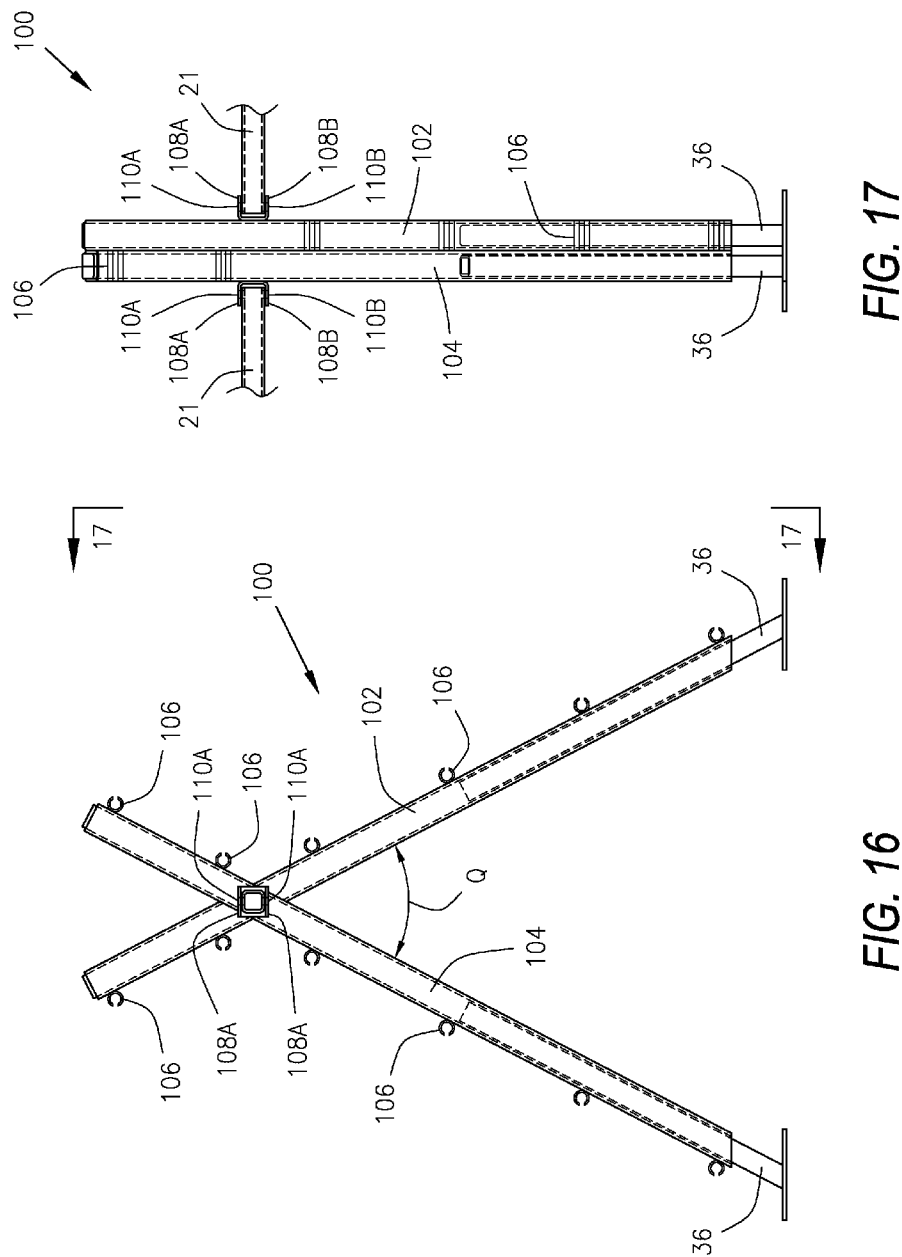

US 8,573,566 B2

FREESTANDING FENCE SYSTEM

CROSS-REFERENCE TO RELATED APPLICATIONS

The present application is a continuation in part application of U.S. patent application Ser. No. 11/713,052 filed on Mar. 1, 2007, now U.S. Pat. No. 7,753,346B2, for the invention entitled FREESTANDING FENCE.

BACKGROUND OF THE INVENTION

1. Field of the Invention

The present invention relates to a freestanding fence that is supported on footed x-shaped posts. A horizontal member extends between adjacent x-shaped posts and a footed vertical support member can be installed on each horizontal member approximately midway between the adjacent x-shaped posts to provide additional support. Several fence wires extend horizontally and connect adjacent x-shaped posts along the length of the fence. The horizontal members attach to the x-shaped posts with universal joints in the form of couplings that allow for both vertical and horizontal adjustment that allow the horizontal member to attach to the x-shaped posts at virtually any angle.

2. Description of the Related Art

It is often desirable to construct a freestanding fence that can later be moved and reused in a different location and used in a different configuration. Also, it would be desirable if the materials used to construct the fence where pieces that were easily transported using a pickup truck and could be assembled and disassembled using a few simple tools.

The present invention addresses these needs by providing a freestanding fence that does not require the digging of post holes and installing posts in the ground. Further the present invention is constructed of readily available square tubing and a few connectors that attach together to construct a fence that can be made in almost any configuration and installed on almost any terrain. Because the present invention is constructed in pieces, it can be disassembled, moved, reconfigured and reassembled multiple times without damage to the pieces.

Further, the present fence is not as likely to serve as a ground for lightening strikes as would a fence that had posts buried in the ground. This is particularly true when the feet of the present invention are pretreated with a non-conductive plastic or rubber coating.

Still further, with only slight modification, the horizontal members of the present fence can be used as a conduit for water so that the fence can additionally be used as a lawn sprinkler. And the horizontal members can be used as a conduit for security system wiring, lighting, communications, fiber optics, electrical wiring, cameras, monitoring devices, solar panels, radio frequency identification devices, etc.

Also, the present fence is structurally strong so that it can be used to mount additional equipment on the fence, such as for example monitoring devices, lighting, alarm systems, communication or transmission devices, cameras, motion detection equipment, radio frequency identification equipment, solar panels, etc.

Because of the unique features of this fence and the easy and speed with which it can be constructed and deconstructed, the uses for the present fence are numerous. These uses may include agricultural applications; electrical, chemical and industrial facilities protection; and government installations, including military facilities, border perimeter fencing, etc.

SUMMARY OF THE INVENTION

The present invention is a freestanding fence that is supported on x-shaped posts. Each leg of the x-shaped posts has a post foot on its lower end on which the post rests upon the top of the ground. A horizontal member extends between adjacent x-shaped posts and a vertical support member can be installed on each horizontal member approximately midway between the adjacent x-shaped posts. Each vertical support member has a member foot on its lower end on which the vertical support member rests upon the top of the ground.

Several fence wires extend horizontally and connect adjacent x-shaped posts along the length of the fence. The fence wires are attached to the posts with a combination of traditional electrical insulators and with non-conductive wire fasteners so that the fence wires can be connected to an appropriate electrical source to convert the fence into an electric fence. The horizontal members can be used as a conduit or structure for watering systems, network cabling conduits, lighting systems, cameras, radio frequency identification systems, solar panels, or security systems with only slight modifications to the tubing from which the horizontal members are constructed. And the x-shaped posts can be employed to support a water hose in the upwardly extending valley of the posts by simply laying a water hose on top of the posts.

The horizontal members are attached to the posts by means of universal joints in the form of couplings that allow for both vertical and horizontal adjustment thereby allowing the fence to be arranged in straight, irregular, or curved arrangements when viewed from above and can be used on hilly, swampy, sandy, or rough outdoor or indoor terrain where it would be difficult to install traditional fence posts in the ground.

The freestanding fence is constructed of easily assembled pieces which require only the use of a couple of wrenches to assemble. This allows an owner to easily transport the materials needed to construct the fence in the back of a pickup truck. And because the fence is constructed in pieces, it can be disassembled, moved, and then reassembled as often as needed.

An alternate embodiment of the present invention employs alternate welded x-shaped posts instead of the x-shaped posts made with x-shaped connectors. The two tubes forming the alternate x-shaped posts or x-posts are welded or otherwise secured together at approximately a 55 degree angle. This angle provides maximum stability although the angle can be varied somewhat. The legs of the alternate x-shaped posts are provided with adjustable feet, and receivers for receiving wires therein are secured, preferably by welding, along the length of each tube. Also, a pair of ears is secured to the sides of each tube, preferably by welding and to which the universal joints secure as a means of securing the horizontal members to the alternate x-shaped posts, as previously described.

BRIEF DESCRIPTION OF THE DRAWINGS

FIG. 1 is a perspective view of a freestanding fence constructed in accordance with a preferred embodiment of the present invention.

FIG. 2 is an end view taken along line 2-2 of FIG. 1.

FIG. 3 is a side view taken along line 3-3 of FIG. 2.

FIG. 4 is an enlarged side view of a vertical support member shown within the circled area associated with numeral 4 of FIG. 1.

FIG. 5 is an end view taken along line 5-5 of FIG. 4.

FIG. 6 is an enlarged cross sectional view taken along line 6-6 of FIG. 4.

FIG. 7 is an enlarged side view of the coupling shown within the circled area associated with numeral 7 of FIG. 3.

FIG. 8 is a top plan view taken along line 8-8 of FIG. 7.

FIG. 9 is an enlarged end view of the post foot shown within the circled area associated with numeral 9 in FIG. 2.

FIG. 10 is a side view of the post foot taken along line 10-10 of FIG. 9.

FIG. 11 is an enlarged end view of a non-conductive wire fastener shown within the circled area associated with numeral 11 in FIG. 2.

FIG. 12 is an exploded top plan view taken along line 12-12 of FIG. 11.

FIG. 13 is a side view taken along line 13-13 of FIG. 11.

FIG. 14 is an end view of the non-conductive sleeve of the wire fastener taken along line 14-14 of FIG. 12.

FIG. 16 is an end view similar to FIG. 2 showing an alternate embodiment x-shaped post that may be used with the invention instead of the x-shaped post illustrated in FIG. 2.

FIG. 17 is side view of the alternate x-shaped post of FIG. 16 taken along line 17-17.

DETAILED DESCRIPTION OF THE PREFERRED EMBODIMENT

Figure 15:
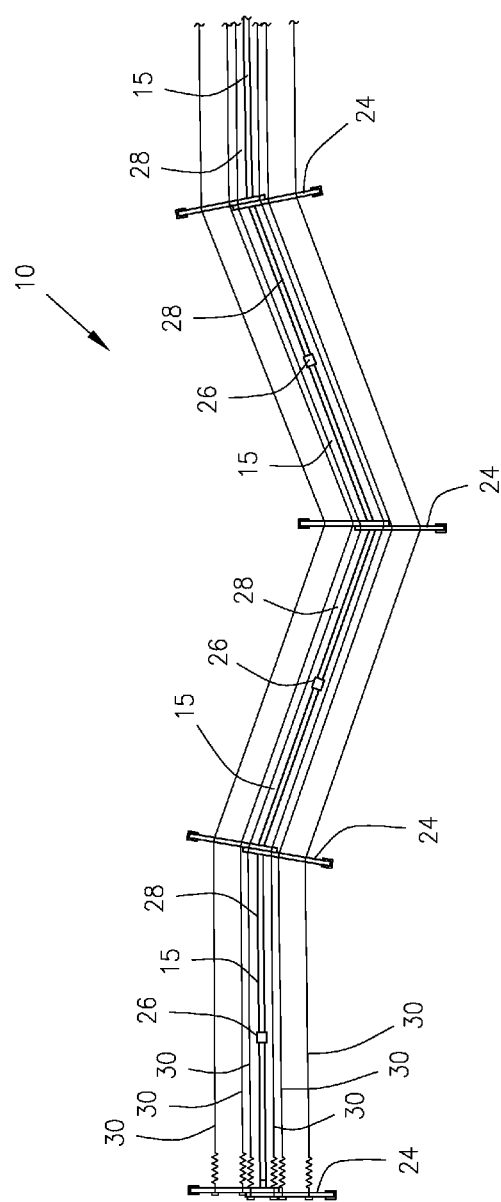
FIG. 15 is a top view of a freestanding fence constructed in accordance with a preferred embodiment of the present invention illustrating that the fence can be constructed with odd angles and curves.

Referring now to drawings and initially to FIG. 1, there is illustrated a freestanding fence 10 constructed in accordance with a preferred embodiment of the present invention. The fence 10 is generally constructed of pieces of square tubing 12, 14, 15, and 16 connected together by means of two types of connectors 18, 20, one type of coupling 21, and one type of fastener 22 to form vertically oriented x-shaped posts 24 and support members 26 that are connected together by horizontal members 28 and fence wire 30, as will be more fully described hereafter.

As best seen in FIGS. 2 and 3, each x-shaped post 24 is constructed of two pieces of square tubing 12 and 14 that are held together in a criss-cross orientation by a hollow x-shaped connector 18 so that the two pieces of square tubing 12 and 14 form the two legs 29 and 31 of the x-shaped posts 24. As shown in FIG. 7, each x-shaped connector 18 is provided with a pair of hollow sleeves 32 and 34 for receiving the two pieces of square tubing 12 and 14. A threaded bolt 35 extends through the wall of each sleeve 32 and 34 of the connector 18 to engage its associated piece of square tubing 12 or 14 as a means of securing the square tubing 12 or 14 within the x-shaped connector 18 and thus securing the two legs 29 and 31 of the x-shaped post 24 together.

Referring to FIGS. 2 and 9, each leg 29 and 31 of an x-shaped post 24 has a post foot 36 secured on its lower end so that the post foot is adjustable in height. Each post foot 36 is provided with a hollow sleeve 38 and the lower end of the leg 29 or 31 is received within the hollow sleeve 38 and secured therein by means of another threaded bolt 35 that extends through the wall of the sleeve 38 to engage its associated leg 29 or 31 in order to secure the post foot 36 at the desired height relative to the leg 29 or 31. The posts 24 rest on their post feet 36 upon the top of the ground. As shown in the FIGS. 2 and 9, the post feet 36 on the x-shaped posts 24 are at an acute angle 42 relative to the legs 29 and 31 of the posts 24 so that the post feet 36 will lay flat on the ground. This is necessary since the legs 29 and 31 of the x-shaped posts 24 are oriented at an acute angle 42 to the ground in the completed fence 10.

As illustrated in FIG. 7, the x-shaped connector 18 is provided with a pair of ears 44A and 44B on either end of the connector 18. The ears 44A and 44B of each pair are provided with bolt openings 46A and 46B therethrough which align vertically with a first bolt opening 47 provided in a first portion 21' of the coupling 21 and receive a threaded bolt 35 therethrough as a means of securing a first portion 21' of a coupling 21 to the x-shaped posts 24. The bolt 35 is held in place by washers 51 and a nut 53. As shown in FIG. 8, the first portion 21' of the coupling 21 attaches on an opposite end to another pair of ears 48A and 48B provided on a second portion 21" of the coupling 21 that are oriented at 90 degrees from the pair of ears 44A and 44B provided on the x-shaped connector 18. The second pair of ears 48A and 48B are also provided with a pair of bolt openings 49A and 49B therethrough which align horizontally with a second bolt opening 55 provided in the first portion 21' of the coupling 21 and receive a threaded bolt 35 therethrough as a means of securing the first and second portions 21' and 21" of the coupling 21 together. The threaded bolt 35 is held in place with washers 51 and a nut 53.

By the ears 44A and 44B being oriented 90 degrees from the ears 48A and 48B, the coupling 21 allows for both vertical and horizontal adjustment of the angle of attachment of the horizontal members 28 to the x-shaped posts 24. An opposite end of the second portion 21" of the coupling 21 is provided with a hollow sleeve 50 designed to receive therein one end of the piece of square tubing 15 that forms the horizontal member 28. The square tubing 15 of the horizontal member 28 is secured within the hollow sleeve 50 of the second portion 21" of the coupling 21 by means of a threaded bolt 35 that extends through the wall of the second portion 21" of the coupling 21 to engage the square tubing 15 of the horizontal member 28. Additional horizontal members 28 extend between adjacent x-shaped posts 24 and are likewise secured on their opposite ends to the x-shaped posts 24 by additional couplings 21 and x-shaped connectors 18.

Because the couplings 21 that connect the horizontal members 28 to the posts 24 allow for horizontal adjustment, this enables the fence 10 to be arranged in straight, irregular, or curved arrangements when viewed from above, as illustrated in FIG. 15. And because the couplings 21 that connect the horizontal members 28 to the posts 24 also allow for vertical adjustment, this enables the fence 10 to be used on hilly, rocky, swampy, sandy, or rough outdoor or indoor terrain where it would be difficult to install traditional fence posts in the ground.

Referring to FIGS. 1, 4, 5, and 6, a vertical support member 26 can be installed on each horizontal member 28 approximately midway between the adjacent x-shaped posts 24 to provide additional support. The vertical support member 26 has a top connector 20 that has a first hollow sleeve 52 for receiving therethrough the piece of square tubing 15 that forms the horizontal member 28. The top connector 20 is also provided with a second hollow sleeve 54 at approximately a 90 degree angle from the first sleeve 52 for receiving the piece of square tubing 16 that forms the vertical support member 26. The square tubing 16 is secured within the second sleeve 54 by means of a threaded bolt 35 that extends through the wall of the second sleeve 54 to engage the square tubing 16 of the vertical support member 26.

Each vertical support member 26 has a member foot 56 on its lower end on which the vertical support member 26 rests upon the top of the ground. Each member foot 56 has a hollow sleeve 58 for receiving the lower end of the square tubing 16 that forms the vertical support member 26, and the square tubing 16 is secured within the sleeve 58 of its associated member foot 56 by means of a threaded bolt 35 that extends through the wall of the member foot's sleeve 58 and engages the square tubing 16. As shown in FIGS. 1, 4 and 5, the member 56 provided on the vertical support members 26 are preferably at approximately a 90 degree angle relative to their associated vertical support members 26 so that the member feet 56 rest on the ground and hold the vertical support members 26 vertically above the ground.

Referring again to FIG. 1, several fence wires 30 extend horizontally and connect to adjacent x-shaped posts 24 along the length of the fence 10. The fence wires 30 are attached to the fence posts 24 by a combination of traditional electrical insulators 60 and with non-conductive fasteners 22 so that the fence wires 30 can be connected to an appropriate electrical source (not illustrated) to convert the fence 10 into an electric fence.

The non-conductive fasteners 22 are shown in detail in FIGS. 11-14. Each of these non-conductive fasteners 22 is provided with a hollow sleeve 62 with a threaded bolt 35 for securing the fastener 22 to a leg 29 or 31 of the x-shaped posts 24 by first inserting the leg 29 or 31 through the hollow sleeve 62 and then causing the threaded bolt 35 to engage the leg 29 or 31 to hold the fastener 22 on the leg 29 or 31. Each non-conductive fastener 22 is provided with a pair of ears 64A and 64B that have horizontally aligned slots 66A and 66B for receiving a hollow non-conductive sleeve 68. Each non-conductive sleeve 68 is provided with a longitudinal slit 70 therein so that the non-conductive sleeve 68 can be slipped over a fence wire 30 and then inserted into the aligned slots 66A and 66B in the pair of ears 64A and 64B provided on the fastener 22. The longitudinal slit 70 is preferably inserted into the slots 66A and 66B first so that the wire 30 is captured within the slots 66A and 66B and held inside the hollow non-conductive sleeve 68.

As described and illustrated, the freestanding fence 10 is constructed of easily assembled pieces of tubing 12, 14, 15, and 16 and post feet 36 and member feet 56 secured together with connectors 18 and 20, couplings 21, fasteners 22, and fence wire 30 which require only the use of a couple of wrenches to assemble. This allows an owner to easily transport the materials needed to construct the fence 10 in the back of a pickup truck. And because the fence 10 is constructed in pieces, it can be disassembled, moved, and then reassembled as often as needed.

Although not illustrated, the feet 36 and 56 can be pretreated with an electrically non-conductive coating to make the fence 10 even less likely to serve as an electrical ground for lightening strikes, making the fenced area safer for livestock that generally tend to congregate at the fence when a storm approaches.

Further, although not specifically illustrated, by making only slight modifications to the horizontal members 28, such as sealing both ends of the hollow pieces of square tubing 15 forming the horizontal members 28 and adding water nozzles at both ends, the horizontal members 28 of the present fence 10 can be used as a conduit for water. By also adding sprinkler heads, the fence 10 can additionally be used as a lawn sprinkler system. And with similar minor modifications, the horizontal members 28 can be used as conduit for lighting, security system wiring, cameras, fiber optics, network cabling, electrical wiring, radio frequency identification devices, solar panels, etc.

And as shown in FIGS. 1 and 2 the upper portion of each x-shaped connector 18 and posts 24 form a valley 72 that opens upward. Without any modifications to the fence 10, these valleys 72 can be employed to support a water hose (not illustrated) or other similar items off of the ground by laying the items on top of the x-shaped connector 18.

Referring now to FIGS. 16 and 17, there is illustrated an alternate embodiment x-shaped post 100 that is used in association with the invention 10 instead of the x-shaped posts 24. The two tubes 102 and 104 form the legs of the alternate x-shaped post 100. The two legs 102 and 104 are welded or otherwise secured together at approximately a 55 degree angle (Angle Q). Each of the alternate x-shaped post's legs 102 and 104 is provided with an adjustable length foot 36.

Each of the alternate x-shaped post legs 102 and 104 is provided with a plurality of c-shaped receivers 106 secured along the length of the tubes 102 and 104. The c-shaped receivers 106 are preferably welded to the tubes 102 and 104. The c-shaped receivers 106 are designed for receiving the non-conductive hollow sleeve 68 and fence wire 30 therein, as previously described for the fasteners 22.

Also, a pair of ears 108A and 108B are secured to the each tube, preferably by welding. Each ear 108A and 108B is provided with a bolt opening 110A and 110B therethrough so that the bolt openings 110A and 110B provided in each pair of ears 108A and 108B are aligned and serve to replace the ears 44A and 44B as a means of attaching the coupler 21 to the alternate x-shaped post legs 102 and 104. Together the ears 108A and 108B of the alternate x-shaped post 100, the bolt 35 that movably attaches the coupler 21 to the ears 108A and 108B, and the coupler 21 collectively form a universal joint. The universal joints then secure the horizontal members 28 between adjacent alternate x-shaped posts 100, in a manner similar to that previously described and illustrated in FIGS. 1, 7, and 8 in association with the x-shaped posts 24.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A freestanding fence system comprising:
   x-shaped posts, each x-shaped post formed of two metal legs that are welded together, an adjustable length horizontally disposed post foot provided at a lower end of each leg of the x-shaped posts and, a rigid tubular horizontal member attached between adjacent x-shaped posts by means of universal joint couplings to secure the x-shaped posts together, and said universal joint couplings reversibly locked to the x-shaped posts to secure the x-shaped posts into a rigid unitary and free-standing above-ground structure.

2. A freestanding fence system according to claim 1 further comprising:
   a plurality of electrically non-conducting wire receivers secured to the side of each leg of the x-shaped posts for receiving fence wire therein, hollow electrically non-conductive sleeves for wrapping around fence wire before the fence wire is inserted into slots provided in the wire receivers that allow the fence wire to be secured to the x-shaped posts in a doubly insulated manner, said plurality of wire receivers provided on both legs of the x-shaped posts, and wire secured to the plurality of wire receivers forming two intersecting planes of horizontally disposed wire supported by the x-shaped posts.

3. A freestanding fence system according to claim 2 further comprising:

electrically charged fence wire attached horizontally in an electrically isolating manner to the wire receivers on both legs of adjacent x-shaped posts.

4. A freestanding fence system according to claim 1 further comprising ears provided on each x-shaped post, bolts extending through openings in the ears and through openings in the universal joint couplings for adjustably attaching the universal joint couplings to the x-shaped post as a means of securing the horizontal members between adjacent x-shaped posts.

5. A freestanding fence system according to claim 1 further wherein each x-shaped post further comprises:

two straight tubular post legs that are secured together in side-by-side arrangement so that the two post legs are offset from one another.

6. A freestanding fence system according to claim 1 further comprising:

a vertical support member provided on at least one of the horizontal members, an adjustable length horizontally disposed foot provided on a lower end of each vertical support member.

7. A freestanding fence system according to claim 1 wherein the legs forming the x-shaped posts are secured together at a fixed angle of approximately 55 degrees.

8. A freestanding fence system according to claim 1 wherein said x-shaped posts and each said rigid tubular horizontal member constructed of metal.

9. A freestanding fence system according to claim 1 wherein said x-shaped posts are hollow.

10. A freestanding fence system according to claim 1 further comprising:

said universal joint couplings reversibly locked to the x-shaped posts with nuts and bolts to secure the x-shaped posts into a rigid unitary and free-standing structure, and each said post foot reversibly locked to its associated x-shaped post to secure the x-shaped posts into a rigid unitary and free standing structure.

\* \* \* \* \*